April 14, 1959     A. J. HAMREN     2,882,097
AIR-CONVEYOR

Filed Dec. 19, 1956     2 Sheets-Sheet 1

INVENTOR:
ARVID J. HAMREN
BY
ATT'YS

April 14, 1959  A. J. HAMREN  2,882,097
AIR-CONVEYOR
Filed Dec. 19, 1956  2 Sheets-Sheet 2
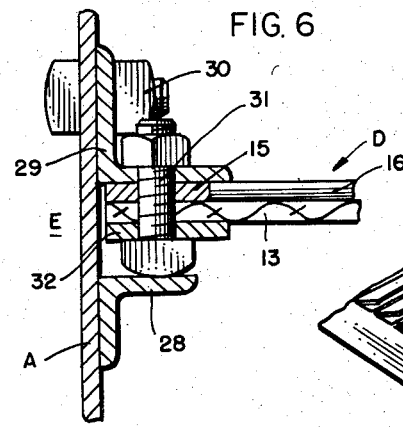
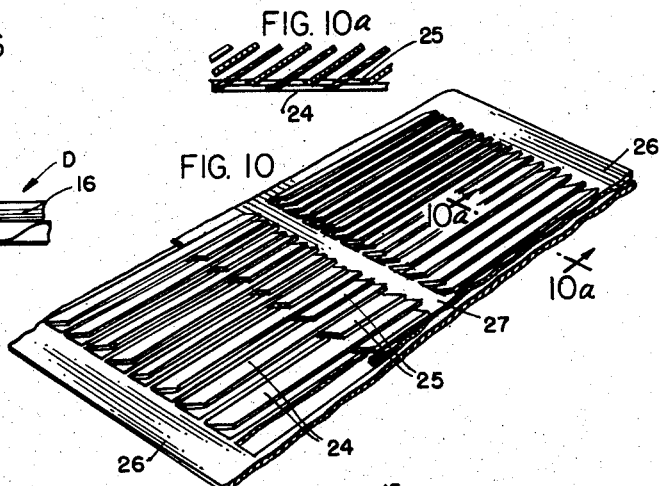
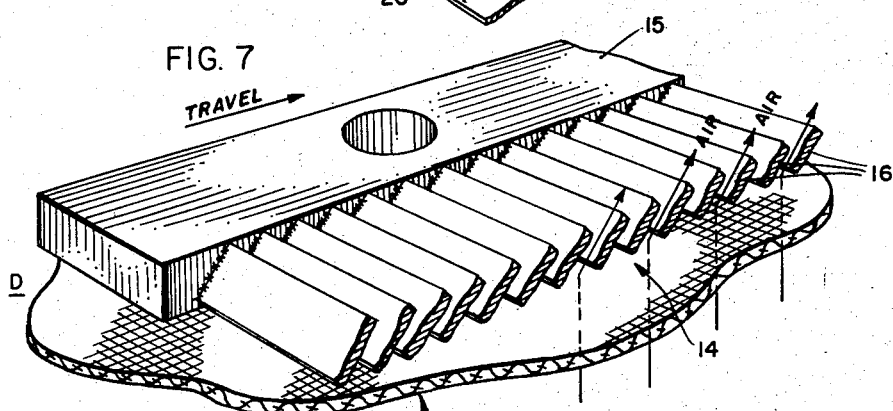
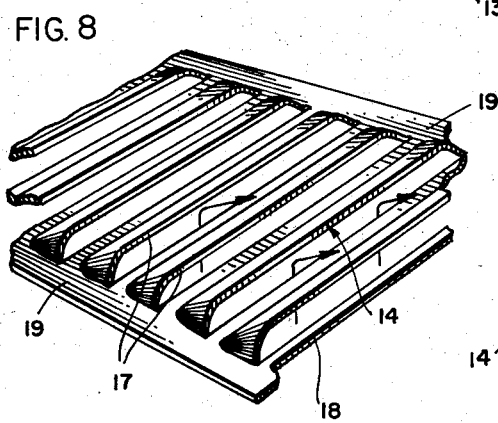
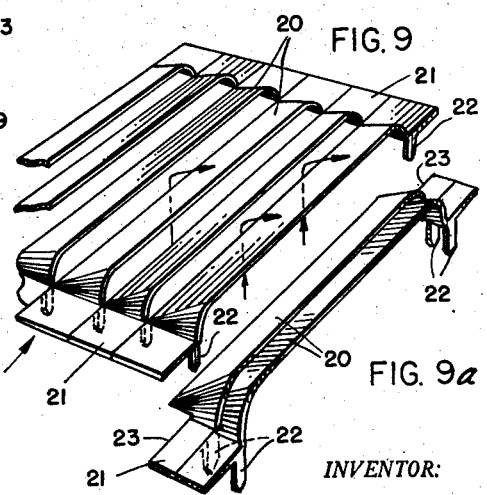
INVENTOR:
ARVID J. HAMREN
BY
ATT'YS

# United States Patent Office 2,882,097
Patented Apr. 14, 1959

2,882,097

AIR-CONVEYOR

Arvid J. Hamren, Oakland, Calif.

Application December 19, 1956, Serial No. 629,289

9 Claims. (Cl. 302—29)

This invention relates to aeration apparatus for moving pulverulent material through conveyor conduits from a source of storage to a point of discharge. Such apparatus is commonly referred to as an "air-conveyor" or "air-chute."

The practice is well-known of constructing air-chutes for moving pulverulent material through a conduit, divided into two chambers by a porous partition, into one of which chambers is injected a controlled-flow of low-pressure gas for passage through the partition to fluidize and facilitate the movement of the pulverulent material through the other chamber from the source of storage.

In these prior structures, the conduits have been of varying cross-sectional form, tubular or rectangular. The partitions have been formed of such materials as permeable stone, multiple-woven fabric, compressed felt fibers, and the like. The gas, generally, has been compressed air.

As a rule structures of this kind heretofore in use have had to have the conduit disposed at a downward incline, from the point of entrance of the pulverulent material, in order to achieve a satisfactory movement of the pulverulent material. Such inclines have had to be as much as two inches to each foot of conduit length. In many installations such an inclination of the conduit has resulted in a disadvantageous loss of head-room. Another disadvantage has been excessive wear of textile fabrics especially at loading points.

The main objects of this invention are to provide an improved air-chute structure for effecting the movement of pulverulent materials through a conduit with a minimum loss of head-room due to inclination of the conduit; to provide an improved partition structure of this kind which, while maintaining a high degree of permeation of gas through the porous partition material, provides a low coefficient of sliding friction in the movement of the pulverulent material along the partition; to provide an improved partition structure which affords protection from wear to the relatively soft porous material of the partition; to provide such an improved partition structure as will permit the effective gas-directed movement of the pulverulent material through horizontal and even slightly upwardly-inclined conduits; to provide an improved partition structure of this kind for use in conduits of either tubular or rectangular cross-section; to provide improved means for securing an improved partition structure of this kind in certain types of conduit; and to provide an improved gas-permeable partition structure of this kind which is simple in form, capable of being economically constructed, and which is more efficient than any of the previously-known air-chute structures.

In the adaptations shown in the accompanying drawings:

Fig. 6 is an enlarged, fragmentary, sectional detail of a conduit mounting for the improved form of partition, the view being an enlargement of the portion shown in the dot-and-dash circle of Fig. 3;

Figs. 7, 8, 9, 9–a and 10 show varying ways of forming the louvers for the improved partition structure; and Fig. 10–a is a sectional view as taken on line 10–a—10–a of Fig. 10.

The essential concept of this invention involves a conduit-dividing partition of gas-permeable material one face of which is overlaid with a series of parallel, transversely disposed closely-spaced, narrow ridges or vanes inclined in the direction of material flow.

An air-chute embodying the foregoing concept comprises a conduit A divided into two compartments or chambers B and C by a gas-permeable, louver-surfaced partition D.

Figure 1:
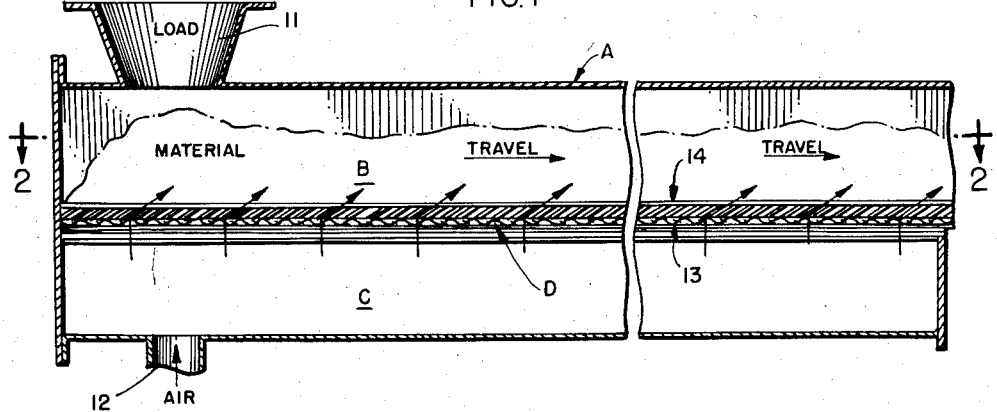
Figure 1 is a longitudinal, sectional elevation of an air-chute having a dividing partition constructed in accordance with this invention.
Figure 2:
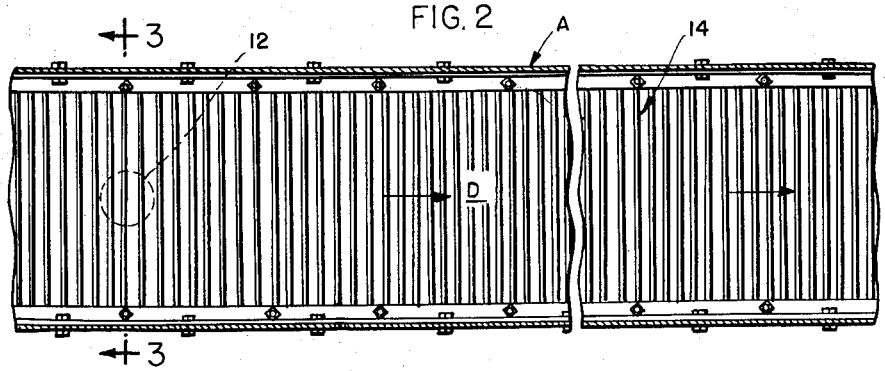
Fig. 2 is a horizontal, sectional view of the same taken on the plane of the line 2—2 of Fig. 1.

The conduit A, as a part of an air-chute, may be of almost any cross-sectional form that circumstances may require or make convenient. Conduits of rectangular and tubular cross-sectional form are here shown equipped with my improved form of gas-permeable partition D for dividing the conduit into the two requisite chambers B and C. As shown, the conduit A is provided with suitable ports 11 and 12 located adjacent the loading end for the admission of pulverulent material from a storage bin or other source and gas under pressure to the respective chambers B and C. At the opposite end of the conduit A would be a discharge outlet from the chamber B (not here shown) for the pulverulent material. The contiguous end of the gas chamber C, of course, would be closed, as shown in Fig. 1, since the escape of gas from the chamber C is only through the pores of the partition D into the chamber B.

The hereinshown partition D comprises a web 13 of porous material on the upper face of which is a series of parallel, closely-spaced louvers 14, inclined in the direction of material movement. The partition D is secured in place in the conduit A by a type of clamping means E appropriate to the form of the conduit and the form of the partition, as presently will be explained.

The web 13 here is shown as a sheet of fabric such as canvas. However, such partition web 13 could be made of any self-sustaining material of a gas-porous nature which could be clamped in the conduit A and which would then support the pulverulent material that has to be passed through the conduit.

The louvers 14 may be formed in any manner and of any material which would provide a series of closely-spaced, parallelly-inclined ridges on the upper surface of the web 13, so that the gas emanating from the porous web 13 tends to be directed as thin sheets, each comprising many substantially parallel pencils or streams of gas, into the nearest layer of the overlaying pulverulent material. Such sheets of gas tend to effect the aeration of said layer of the pulverulent material; hence, this fluidization will affect the angle of repose of the material and thus will accelerate its movement along the conduit. Also, these louver-formed sheets of gas reduce to a minimum the likelihood of the pulverulent material clogging the pores and wearing the surface of the web 13.

Several types of louver constructions are shown in Figs. 7, 8, 9, 9–a, 10 and 10–a any one of which may be adapted for use within substantially any form of conduit required. Such types of louver may be made of any material that has sufficient inherent rigidity to maintain its shape under the weight of the pulverulent material that may at times have to be in transit through the conduit A. Obviously, steel, aluminum, brass, or other rust resistant sheet metal most readily lends itself to the formation of any one of these types of louver construction. The sequence in which these forms now will be described does not necessarily indicate a preference.

Forming louvers 14 in the manner illustrated in Fig. 7 mainly involves two side plates 15, and a plurality of slats 16. The plates 15 have square sides, normal to the face surfaces and the slats 16, with square cut ends, are laid up in a suitable jig so that their ends abut the adjacent sides or edges of the plates 15. The ends of the slats are then bonded to the side plates in a suitable manner, such as brazing, so that the assembly may be handled as a louvered unit. Preferably the slats 16 are about 3/32" to 1/8" high, are spaced apart to provide slots of 1/32" to 1/8" in width, and are inclined, in the direction of material flow, about 30° to 45° from the plane of the side plates.

The slats 16 are of a length to provide an assembled louver structure of substantially the same width as the partition web 13. These assemblies may be made of any conveniently handled length and are clamped, riveted or otherwise mounted on the upper surface of the partition web to form the completed partition D. Such a partition D is then ready to be secured in a conduit A, as will be explained presently.

The louver formation of Fig. 8 is a sheet-metal stamping wherein portions 17 are struck up at an incline from the plane of a sheet 18 to form louver blades. The lateral edges of the sheet 18 are continuous to form supporting and reinforcing margins 19 for the louvered structure. Such a preformed louver sheet is overlaid on the web 13 and both suitably secured or clamped together to span and divide the conduit A into the requisite chambers B and C. It will be understood that, where the span is relatively large, the stamping may be made with 2 or more rows of the stamped out louvers all formed in a single sheet.

The louver formation of Fig. 9 comprises individual elements 20 in the form of narrow strips which have the major portions intermediate the ends 21 struck up at an incline to the plane of the ends 21. A series of these elements 20 may be arranged in parallel, edge to edge abutting relationship with each other on the upper face of a web 13 and secured in place by any suitable means. As shown, the elements 20 are each formed with integral staple legs 22 depending from the end portions 21 and adapted to pierce the web 13 to secure the element thereon.

Also, as shown in Fig. 9–a, the end portions 21 of each of the elements 20 may be formed with the rearward half cut away, as at 23, so that the elements may be mounted in shingled or overlapping relation to minimize the space between successive blades and provide thin sheets of directed fluidizing gas. In this case the rearward or lowermost part of the formed intermediate portions of each louver element is made to be of less length than the opening at the forward end so that the rear end of one element may be received telescopingly within the front end of the next rearwardly adjacent element.

In the louver arrangement of Figs. 10 and 10–a a pair of sheet stampings 24 and 25, are made so that they can be nested one on top of the other, with the louver elements or blades in mutually overlapping relation. In this case the stampings may be made with the blades cut free from the end and intermediate-reinforcing strips 26 and 27 and the upper stamping made with its blades somewhat longer than the blades of the lower stamping so that the latter will be received in the blade openings of the upper member. The stampings 24 and 25 are shown with two columns of louvers so that the span of each blade need not be too long for adequate strength, however, the arrangement may be used with either a single column of blades or with more than two columns depending upon conduit size. Preferably this nested louver arrangement will be used with the free edges of the blades engaging the fabric 13 of the partition, that is the reverse of the position shown in Fig. 10. It will be understood, however, that the nested louvers may also be used with the flat side against the fabric if desired.

The clamping means E, for securing in place in a conduit A, an improved partition structure D of this kind, will depend somewhat upon the form of the conduit and the form of the louvers. Three different forms of clamping means E are indicated in the drawings.

Figure 3:
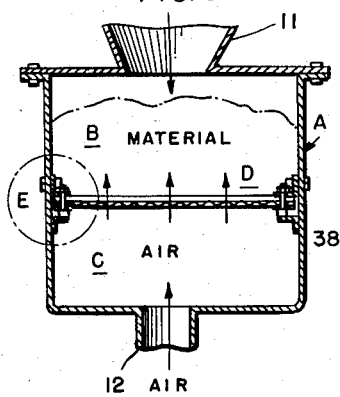
Fig. 3 is a transverse, sectional view of the structure shown in Fig. 1 taken on the plane of the line 3—3 of Fig. 2.

For the conduit A of rectangular cross-sectional form the clamping means E shown in Figs. 3 and 6 comprises pairs of members 28 and 29 and fasteners 30 and 31. The members 28 and 29 here are shown as angle bars. The lower bar 28 is fixedly secured to the inner wall of the conduit A and its purpose is to serve as a vertical support and sliding rail for endwise insertion of the partition D into the conduit A. Also, in those cases where the conduit may be opened from its top side, the bars 28, there being one on each side of the conduit, serve to support the partition D in proper position while the partition is being otherwise secured in place. The upper clamp bar 29 is secured on the conduit wall, by the conventional bolt-and-nut fastener 30, in opposition to the slide bar 28. The second fastener 31, shown here in the form of the conventional bolt and nut, clamps the lateral perimetrical portions of the partition D between the bar 29 and an intervening strip 32 which serves as a backing for the porous fabric 13. The fastener 30 removably secures the bar 25 on the conduit wall and if desired this fastener may be a cap screw having threaded engagement with a suitable tapped hole in the bar 29.

The foregoing type of partition-clamping means E is especially suitable for use with the partition D having the louver arrangement shown in Fig. 7. However, substantially the same clamping means E can be used with a partition D having the louver arrangement of either Fig. 8, 9, 9–a or 10. For the arrangements of Figs. 9 and 9–a, a second clamping strip would be used along the top surface of the ends of the louver elements 20.

For cylindrical conduits A, mounting the improved form of partition structure D, the clamping means E would be different from that suitable for use with the conduit of rectangular form.

Figure 4:
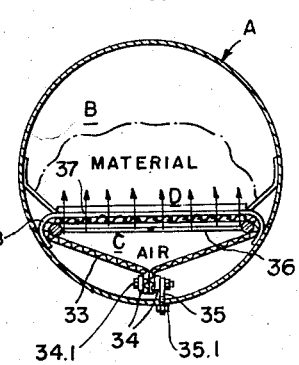
Figs. 4 and 5 are modified forms of this improved partition structure as used in conduits of tubular cross-section.

As shown in Fig. 4 the air chamber C of the conduit A is in the form of a tubular duct 33 made of porous fabric hose, or belting that is rolled longitudinally, and which is clamped to the bottom of the conduit A by suitable means such as the bars 34 and bolts 34.1 disposed inside the conduit A and secured by holddown bolts 35 projecting through suitable openings in the conduit wall and secured by nuts 35.1. In this case the upper side of the duct 33 is flattened to span the conduit A, from side to side, by means of a heavy wire spreader 36 which comprises side rods extending longitudinally within the duct 33 and braced by transverse cross rods. The louver structure 37 is disposed exteriorly on the flat top surface of the duct 33 and, as shown in Fig. 4, is secured by having its side margins 38 turned downwardly and wedged between the rounded edges of the flattened duct portion and the wall of the conduit.

Figure 5:
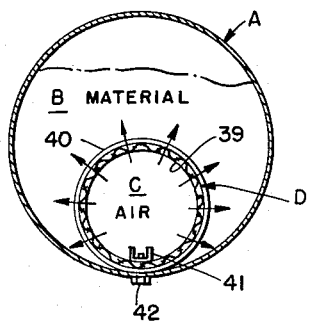

In the arrangement of Fig. 5 the air chamber C is a hose 39 of porous fabric material. However, in this case the hose is in its normal cylindrical form and the louver structure 40 is wrapped around the hose and secured like a jacket, with the louvers encircling the same, to provide the improved partition member D. As shown in Fig. 5, the hose 39 is secured to the conduit by means of a channel bar 41, extending lengthwise within the hose, and screws 42 which extend through the walls of the conduit A and the hose 39 and thread into suitable openings in the channel bar.

In the operation of an air-chute constructed in accordance with this invention, pulverulent material enters the conduit A through the port 11. The fluidizing gas, generally air, entering the port 12, is under pressure throughout the length of the chamber C. This gas permeates the porous web 13 and so impinges on the louvers 14 as to be directed up and forwardly into the overlaying pulverulent material in the form of thin transverse sheets. The material entering the inlet 11, under the head of the material in the storage bin which gives the material a tendency to flow, thus is aerated and simultaneously urged along the conduit A to be discharged at the opposite end thereof.

The forwardly directed thin sheet or apron of air, which is created on top of the porous partition by means of the louvers, also acts as a slide for the air activated material; and as the material is caused into forward motion through a combination of air pressure and angle of repose of the material itself. The material is automatically lifted so that in its motion along the conduit any frictional drag, that might otherwise occur with respect to the partition D, is minimized.

Other advantages of this invention reside in the fact that the porous fabric sheets or belts may be made of thinner materials, because surface wear is practically eliminated. Also the louver structure prevents bellying of the relatively thin fabric web from the gas pressure.

Although several specific embodiments of this invention are herein shown and described it will be understood that details of the constructions shown may be altered or omitted without departing from the spirit of this invention as defined by the following claims.

I claim:

1. An apparatus for conveying pulverulent material comprising, an elongated conduit, a partition of porous material dividing the conduit into longitudinally extending pulverulent-material and gas-pressure chambers, the material chamber face of the partition being formed with a series of rigid transverse closely-spaced parallelly inclined blades extending across substantially the entire width of said face and so disposed as to angulate gas passing from the gas-pressure chamber through the partition and into the pulverulent material chamber and form parallel sheet-like streams of gas flowing in the desired direction of material movement.

2. An apparatus for conveying pulverulent material comprising, an elongated conduit, a partition of porous material dividing the conduit into longitudinally extending pulverulent-material and gas-pressure chambers, a series of parallel louvers extending transversely across substantially the entire face of the partition in the pulverulent-material chamber and inclined from the partition in the direction of material flow, and ports in the conduit for admitting pulverulent material and a gas under pressure to the respective chambers.

3. An apparatus for conveying pulverulent material comprising, an elongated conduit, a partition of porous material dividing the conduit into a pulverulent-material chamber and a gas-pressure chamber, a plurality of narrow flat elements, means for securing the flat elements to the face of the partition in the material chamber in closely-spaced transversely extending and parallelly-inclined relationship to the partition so as to direct gas passing through the partition in the direction of material flow and as sheet-like streams of gas having at a common inclination to the plane of the partition, said elements extending substantially across the width of said partition face, and ports in the conduit for admitting pulverulent material and a gas under pressure to the respective chambers.

4. An apparatus for conveying pulverulent material comprising, an elongated conduit, a web of porous fabric, a plurality of narrow flat elements transversely overlaying one entire face of the fabric and secured thereto in upwardly inclined mutually overlapping relation to provide a longitudinal gas transmitting partition member, means for securing said partition member in said conduit to partition the conduit into a pulverulent-material chamber on the side of the web having said elements and a gas-pressure chamber on the opposite side, and ports in the conduit for admitting pulverulent material and gas under pressure to the respective chambers.

5. An apparatus for conveying pulverulent material comprising, an elongated conduit, a partition of porous material dividing the conduit into pulverulent-material and gas-pressure chambers, a plurality of narrow blade-like elements each of a length substantially equal to the width of said partition, means for securing the said elements to the pulverulent material chamber face of the partition in a closely-spaced transversely extending and parallelly-inclined relationship to the partition so as to direct gas passing through the partition between said elements to flow as a plurality of sheet-like streams of gas having a common inclination to the plane of the partition in the direction of material flow and ports in the conduit for admitting pulverulent material and a gas under pressure to the respective chambers.

6. An apparatus for conveying pulverulent material comprising, an elongated conduit, a partition of porous material dividing the conduit longitudinally into pulverulent-material and gas-pressure chambers, a plate of substantially the same width as said partition having portions thereof struck out from one face thereof to form a series of closely-spaced parallelly-inclined transversely extending louvers, said plate being mounted on one face of the partition with the louvers projecting upwardly therefrom in the direction of material flow, and ports in the conduit for admitting pulverulent material and a gas under pressure to the respective chambers.

7. An apparatus for conveying pulverulent material comprising, an elongated conduit, a partition of porous material dividing the conduit longitudinally into pulverulent-material and gas-pressure chambers, a plurality of narrow flat strips having the main portions intermediate the ends disposed at an incline to the plane of the strip ends, the strips transversely overlaying one face of the partition substantially from edge to edge thereof and being secured thereto to form a series of closely-spaced parallelly-inclined louvers extending from the partition in the direction of material flow, and ports in the conduit for admitting pulverulent material and a gas under pressure to the respective chambers.

8. An apparatus for conveying pulverulent material comprising, an elongated conduit, a partition of porous material dividing the conduit longitudinally into pulverulent-material and gas-pressure chambers, a plurality of narrow flat strips having the main portions intermediate the ends disposed at an incline to the plane of the strip ends, the strips transversely overlaying one face of the partition and being secured thereto in mutually overlapping relation to form a series of closely-spaced parallelly-inclined louvers extending from the partition in the direction of material flow, and ports in the conduit for admitting pulverulent material and a gas under pressure to the respective chambers.

9. An apparatus for conveying pulverulent material comprising, a conduit, a partition of porous material for dividing the conduit longitudinally into pulverulent-material and gas-pressure chambers, a pair of end plates located along the opposite lateral edges of the partition, narrow flat strips extending between and inclined to the plane of the plates in closely spaced parallel relation with each other and with the ends of the strips bonded to the adjacent edges of the respective plates, means for clamping the plates and the lateral edges of the partition to the opposite inner walls of the conduit with the said strips inclined from the partition in the direction of normal material flow in the conduit, and ports in the conduit for admitting pulverulent material and a gas under pressure to the respective chambers.

References Cited in the file of this patent

UNITED STATES PATENTS

| | | |
|---|---|---|
| 545,013 | Dodge | Aug. 20, 1895 |
| 1,307,365 | Kinyon | June 24, 1919 |
| 1,792,286 | Currey | Feb. 10, 1931 |
| 2,527,455 | Schemm | Oct. 24, 1950 |
| 2,527,466 | Townsend | Oct. 24, 1950 |